United States Patent
Noldus et al.

(10) Patent No.: US 12,081,600 B2
(45) Date of Patent: Sep. 3, 2024

(54) METHOD AND DEVICE FOR TRIGGERING SERVICE LOGIC EXECUTION RECORDING FOR A CALL BETWEEN A CALLING USER EQUIPMENT, UE, AND A CALLED UE IN A TELECOMMUNICATION NETWORK

(71) Applicant: Telefonaktiebolaget LM Ericsson (publ), Stockholm (SE)

(72) Inventors: Rogier August Caspar Joseph Noldus, Goirle (NL); Rene Ummels, Breda (NL)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 746 days.

(21) Appl. No.: 16/618,664

(22) PCT Filed: Jun. 8, 2017

(86) PCT No.: PCT/EP2017/064015
§ 371 (c)(1),
(2) Date: Dec. 2, 2019

(87) PCT Pub. No.: WO2018/224154
PCT Pub. Date: Dec. 13, 2018

(65) Prior Publication Data
US 2020/0099725 A1 Mar. 26, 2020

(51) Int. Cl.
*H04L 65/1104* (2022.01)
*H04L 65/1016* (2022.01)
(Continued)

(52) U.S. Cl.
CPC ...... *H04L 65/1104* (2022.05); *H04L 65/1016* (2013.01); *H04L 65/1069* (2013.01);
(Continued)

(58) Field of Classification Search
CPC ............. H04L 65/1006; H04L 65/1016; H04L 65/1069; H04L 67/06; H04L 67/147; H04M 3/2218
(Continued)

(56) References Cited

U.S. PATENT DOCUMENTS

2015/0156130 A1* 6/2015 Varsanyi ............... H04L 47/323 370/412

OTHER PUBLICATIONS

3GPP et al. (3GPP Standard; "3rd Generation Partnership Project; Technical Specification Group Services and System Aspects; Telecommunication management; Subscriber and equipment trace; Trace control and configuration management (Release 13)"; 3GPP TS 32.422, 3rd Generation Partnership Project (3GPP) (Year: 2015).*
(Continued)

*Primary Examiner* — Suraj M Joshi
(74) *Attorney, Agent, or Firm* — Murphy, Bilak & Homiller, PLLC

(57) ABSTRACT

A method for triggering service logic execution recording of a call between a calling User Equipment, UE, and a called UE in a telecommunication network, wherein said service logic execution recording is to be triggered by nodes in a chain of nodes involved in establishing a call between said calling UE and said called UE, wherein said method comprises the step of inserting in a call establishment message, a service logic execution recording parameter, wherein said parameter indicates that nodes involved in said establishing of said call between said calling UE and said called UE should perform service logic execution recording, wherein said service logic execution recording is any of recording of log files and recording of trace files reflecting signalling between said nodes in said chain.

19 Claims, 6 Drawing Sheets

(51) Int. Cl.
  H04L 65/1069 (2022.01)
  H04L 67/06 (2022.01)
  H04L 67/147 (2022.01)
  H04M 3/22 (2006.01)
(52) U.S. Cl.
  CPC ........... *H04L 67/06* (2013.01); *H04L 67/147* (2013.01); *H04M 3/2218* (2013.01)
(58) Field of Classification Search
  USPC ........................................................ 370/329
  See application file for complete search history.

(56) References Cited

OTHER PUBLICATIONS

3GPP2 et al. ("3rd Generation Partnership Project; Technical Specification Group Services and System Aspects; Telecommunication management; Subscriber and equipment trace; Trace concepts and requirements (Release 14)",3GPP Standard ; Technical Specification ; 3GPP TS 32.421, vol. SA WG5, No. V14.0.0, (Year: 2017).*

Fuentes, Felix, et al., "Ethereal vs. TCPdump: A Comparative Study On Packet Sniffing Tools for Educational Purpose", CCSC: South Central Conference, Apr. 2005, pp. 169-176.

Unknown, Author, et al., "3rd Generation Partnership Project; Technical Specification Group Services and System Aspects; Telecommunication management; Subscriber and equipment trace; Trace concepts and requirements (Release 14)", 3GPP TS 32.421 V14.0.0, Apr. 2017, pp. 1-42.

Unknown, Author, "3rd Generation Partnership Project; Technical Specification Group Services and System Aspects; Telecommunication management; Subscriber and equipment trace; Trace control and configuration management (Release 13)", 3GPP TS 32.422 V13.0.0, Jun. 2015, pp. 1-151.

3GPP , "3rd Generation Partnership Project; Technical Specification Group Services and System Aspects; Telecommunication management; Subscriber and equipment trace; Trace concepts and requirements (Release 12)", 3GPP TS 32.421 V12.1.0, Dec. 2014, 1-42.

* cited by examiner

METHOD AND DEVICE FOR TRIGGERING SERVICE LOGIC EXECUTION RECORDING FOR A CALL BETWEEN A CALLING USER EQUIPMENT, UE, AND A CALLED UE IN A TELECOMMUNICATION NETWORK

A method and device for triggering service logic execution recording for a call between a calling User Equipment, UE, and a called UE in a telecommunication network.

TECHNICAL FIELD

The present disclosure is generally related to recording of service logic execution, more specifically to the act of triggering nodes in a telecommunication network to perform service logic execution recording for a particular call.

BACKGROUND

The present disclosure relates to a communication session establishment in a telecommunication network, for example an Internet Protocol, IP, Multimedia Subsystem, IMS, based telecommunication network. In an example, the present disclosure considers the situation that a communication session, typically a voice call, video call or messaging session, is end-to-end established with the aid of a Session Initiation Protocol, SIP, session.

For example, consider a call from one calling User Equipment, UE, towards called UE. The call comprises a control plane, i.e. SIP, Diameter, and a user plane, i.e. a Realtime Transport Protocol, RTP, for voice/video. The SIP signalling for the control plane traverses a number of functional entities, like SIP proxies and SIP application servers. SIP messages are sent end-to-end. For example, an Invite request is generated by the calling UE, is sent towards the called UE and is routed through an IMS core network. Each functional entity the Invite request traverses processes the SIP message, modifies the message and passes the message on to the next intermediate entity or to the endpoint. The user plane, on the other hand, normally takes a direct path directly through the core network.

One of the drawbacks of the existing architecture is that it is difficult to activate, with respect to the signalling plane, logging and transmission control protocol, TCP, dumps at the nodes involved in establishment of a call between a calling UE and a called UE in a telecommunication network. This drawback may be exacerbated through the fluidity of cloud computing, where it's unknown where application logic execution for a call or session will take place. It would be required to activate logging and TCP dump on each node, or part of a node such as a blade, or more precisely: in each application deployment on each virtual machine, in each system node, whilst not knowing on which system node and on which blade the traffic for the call between the calling UE and the called UE will be handled. Hence, extensive manual file processing is required. More particularly, there will, in this manner, be massive amounts of surplus data be generated, especially when there is a large number of nodes, each comprising a large number of application instances.

SUMMARY

It is an object to provide a method for triggering service logic execution recording for a call between a calling User Equipment, UE, and a called UE in a telecommunication network.

It is another object to provide a network node in a telecommunication network arranged for performing service logic execution recording of a call between a calling UE and a called UE within said telecommunication network.

In a first aspect of the present disclosure, there is provided a method for triggering service logic execution recording of a call between a calling User Equipment, UE, and a called UE in a telecommunication network, wherein said service logic execution recording is to be triggered by nodes in a chain of nodes involved in establishing a call between said calling UE and said called UE.

The method comprises the steps of receiving, by a node of said chain of nodes, a call establishment message for establishing said call between said calling UE and said called UE, inserting, by said node, in said call establishment message, a service logic execution recording parameter, wherein said parameter indicates that nodes involved in said establishing of said call between said calling UE and said called UE should perform service logic execution recording.

The method may further comprise the step of recording, by said node, service logic execution for said call between said calling UE and said called UE.

Finally, the method comprises the step of transmitting, by said node, said call establishment message to a next node in said chain of nodes for establishing said call such that each of said nodes in said chain of nodes involved in said establishing of said call is triggered for performing said service logic execution recording for said call between said calling UE and said called UE.

Here, the service logic execution recording is any of recording of log files reflecting the application service logic processing in said nodes and recording of trace files reflecting signalling between said nodes in said chain.

The method is at least based on the insight that a node in the telecommunication network should insert, in a call establishment message, a service logic execution recording parameter, such that each subsequent node involved in the establishment process is made aware that it should perform service logic execution recording. It is noted that the node that inserts the service logic execution recording parameter may perform service logic execution recording itself as well.

The inventors have found that the above is an efficient manner to accomplish that the nodes in a chain of nodes involved in the establishment of a call between the calling UE and the called UE perform service logic execution recording for that particular call only. As such, whenever the call has been terminated, or completed, each of the nodes may stop the logic execution recording as such.

The above circumvents that many log files and/or trace files are created for calls and/or sessions for which that is not necessary. The method of the present disclosure is directed to an efficient manner for enabling or triggering, service logic execution recording for a particular call only.

It is noted that, preferably, the node in the telecommunication network responsible for inserting, in the call establishment message, a service logic execution recording parameter, is a session border controller based node. A session border controller based node is arranged to control the signalling, and normally also any media streams, involved in establishing, conducting, and terminating calls/sessions between calling UE and called UE in a telecommunication network.

The session border controller based node may be especially suitable for the above described task as this node may form the Session Initiation Protocol, SIP, signalling entity at the border of the operator's network. Hence, recording can occur from that node onwards into the telecommunication network. Further, the session border controller based node comprises subscriber profile data. The subscriber profile may contain an indication that the presently described method, as denoted in the present disclosure, may be available to that subscriber.

Here, the term session refers to a particular communication between a calling UE and a called UE. In the context of telephony this would be referred to as a call. Each call may comprise one or more signalling message exchanges that control the call, and one or more call media streams which carry the call's audio, video, or other data along with information of call statistics and quality. All together, the session is formed by the combination of the message exchange and the media streams. The session border controller based node is arranged to influence the data flows of sessions.

It is noted that the recording may take the form of generating log files. Generating a log file may constitute the act of recording.

It is noted that, in accordance with the present disclosure, a UE may comprise any type of equipment suitable for establishing a call and for accepting a call in a telecommunication network. Such devices are, for example, a smart phone, a tablet, communication equipment in a vehicle or anything alike.

One of the advantageous of the present disclosure is that the service logic execution recording is suitably applied for a particular call only, as the call establishment message is used for inserting a service logic execution recording parameter, which parameter forms the trigger for each of the nodes in the chain of nodes to perform the logic execution recording.

Another advantage of the present disclosure is that a convenient manner is provided for service logic execution recording in a complex multi-node telecommunication network, by using the already present signalling of the nodes of the chain of nodes involved in the establishment of a call between the calling UE and the called UE.

It is noted that the functionality of the network node, as presented by the present disclosure, may be implemented in a virtual environment, for example in the cloud.

The present disclosure describes that each of the nodes in the chain of nodes receives the call establishment message, and forwards that particular message to the next node in the chain. This aspect also covers the fact that a particular node construes a new call establishment message based on the received call establishment message, or that a particular node amends the received call establishment message and forwards that amended call establishment message. As such, the forwarded call establishment message does not, necessarily, need to match the received call establishment message completely.

The present disclosure is directed to the establishment of a call between a calling UE and a called UE. The concept of the present disclosure may, however, also be applicable to other types of services, service invocations, call termination, charging signalling, etc.

The expressions, i.e. the wording, of the different aspects comprised by the method and devices according to the present disclosure should not be taken literally. The wording of the aspects is merely chosen to accurately express the rationale behind the actual functioning of the aspects.

In accordance with the present disclosure, different aspects applicable to the above mentioned examples of the methods, including the advantages thereof, correspond to the aspects which are applicable to the devices of the telecommunication network.

In a second aspect of the present disclosure, there is provided a network node in a telecommunication network arranged for performing service logic execution recording of a call between a calling User Equipment, UE, and a called UE within said telecommunication network The network node comprises receive equipment arranged for receiving a call establishment message and establishing said call between said calling UE and said called UE, insert equipment arranged for inserting a service logic execution recording parameter into said call establishment message wherein said parameter indicates that nodes involved in said establishing of said call between said calling UE and said called UE, including said network node, should perform service logic execution recording, record equipment arranged for recording said service logic execution of said call between said calling UE and said called UE, transmit equipment arranged for transmitting said call establishment message to a next node in said chain of nodes for establishing said call such that each of said nodes in said chain of nodes involved in said establishing of said call is triggered for performing said service logic execution recording for said call between said calling UE and said called UE.

Here, said service logic execution recording is any of recording of log files reflecting the application service logic processing in said nodes and recording of trace files reflecting signalling between said nodes in said chain of nodes.

In a third aspect, there is provided a computer program product, comprising a readable storage medium, comprising instructions which, when executed on at least one processor, cause the at least one processor to carry out the method according to any of examples as provided above.

In a fourth aspect, there is provided a network node in a telecommunication network arranged for performing service logic execution recording of a call between a calling User Equipment, UE, and a called UE within said telecommunication network The network node comprises a receive module for receiving a call establishment message and establishing said call between said calling UE and said called UE, insert module for inserting a service logic execution recording parameter into said call establishment message wherein said parameter indicates that nodes involved in said establishing of said call between said calling UE and said called UE should perform service logic execution recording, record module for recording said service logic execution of said call between said calling UE and said called UE, transmit module for transmitting said call establishment message to a next node in said chain of nodes for establishing said call such that each of said nodes in said chain of nodes involved in said establishing of said call is triggered for performing said service logic execution recording for said call between said calling UE and said called UE.

Here, said service logic execution recording is any of recording of log files and recording of trace files reflecting signalling between said nodes in said chain of nodes.

The above-mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
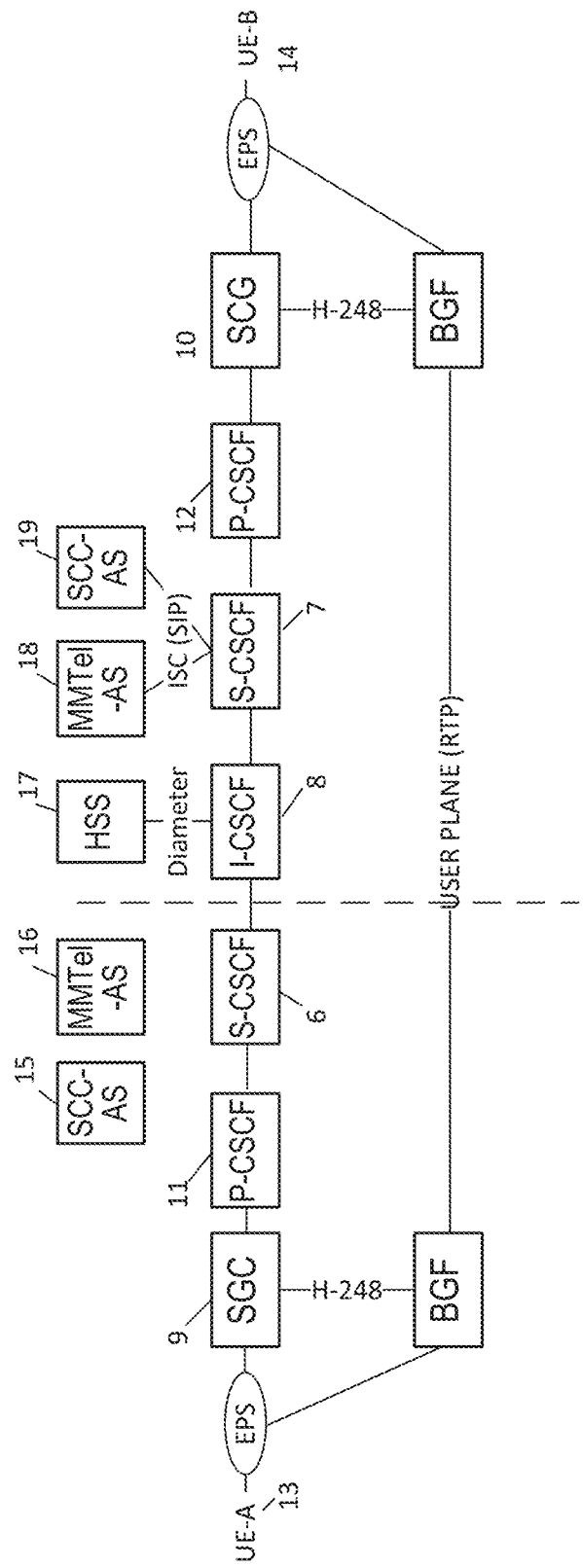
FIG. 1 is a schematic diagram illustrating an end-to-end call establishment in a telecommunication network.

FIG. 1 is a schematic diagram 1 illustrating an end-to end call establishment in a telecommunication network. More specifically, the schematic diagram 1 illustrates an end-to-end Session Initiation Protocol, SIP, session establishment in an Internet Protocol, IP, Multimedia Subsystem, IMS, telecommunication network.

It is noted that the architecture shown in FIG. 1 is a functional decomposition of the IMS telecommunication network. In a deployed architecture, functional entities, i.e. network nodes or network functions, may be combined into a single host or system. For example, a Serving Call State Control Function, S-CSCF, like the one referenced to with reference numerals 6, 7, may be combined with an Interrogating Call State Control Function, I-CSCF, like the one referenced to with reference numeral 8. Further a Session Gateway Controller, like the one referenced to with reference numerals 9, 10, may be combined with a Proxy Call State Control Function, P-CSCF, like the one referenced to with reference numerals 11, 12. Such combinations, typically, do not alter the functioning of the nodes, it is merely used for, for example, optimizing signalling and the use of hardware.

When considering a single call establishment between a calling party 13 and a called party 14, the call establishment is typically processed by nodes in a chain of nodes involved in establishing the call between the calling UE 13 and the called UE 14. In the present scenario, a multitude of nodes are involved in the establishment of the call, for example the nodes as indicated with reference numerals 6, 7, 8, 9, 10, 11, 12, etc.

For example, the SBG 9, the P-CSCF 11, the S-CSCF 6, the Service Centralization and Continuity Application Server, SCC-AS, 15, the Multimedia Telephony Application Server r, MMTel-AS 16 are all involved on behalf of the calling UE 13. The I-CSCF 8 and the Home Subscriber Server, HSS, 17 are involved on behalf of the telecommunication network. The S-CSCF 7, the MMTel-AS 18, the SCC-AS 19, the SBG 10 and the P-CSCF 12 are involved on behalf of the called UE 14.

Figure 2:
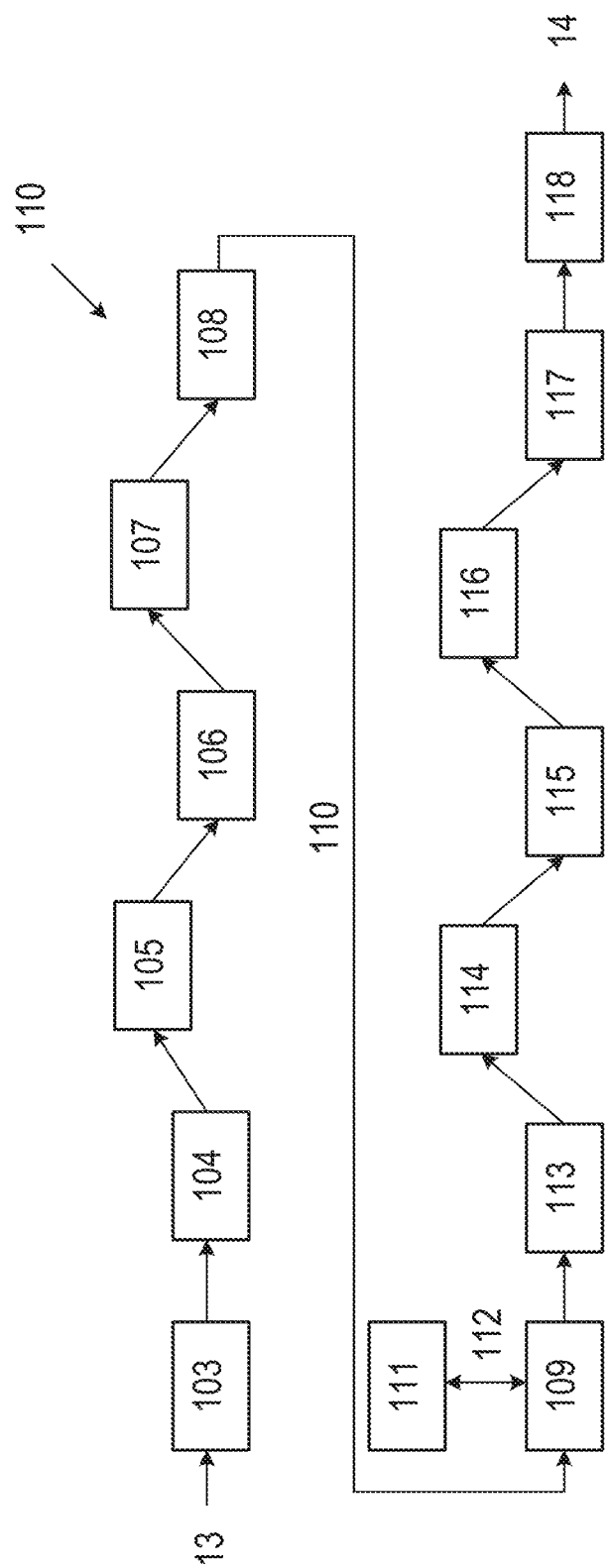
FIG. 2 is a schematic diagram illustrating an end-to-end control plane signalling.

FIG. 2 is a schematic diagram illustrating an end-to-end control plane signalling 100.

The visualized raised position of the MMTel-AS 107 and the SCC-AS 105 is merely cosmetic as it may help to visualize that S-CSCF 104, S-CSCF 106 and S-CSCF 108 form one logical S-CSCF 104, 106, 108. The calling UE is indicated with reference numeral 13 and the called UE is indicated with reference numeral 14.

Here, the method in accordance with the present disclosure is visualized in a concept manner.

The method is disclosed for triggering service logic execution recording of a call between a calling User Equipment, UE, 13 and a called UE 14 in a telecommunication network. The service logic execution recording is to be triggered by nodes, i.e. the nodes referenced to starting from 103 and ending with 118, in a chain of nodes involved in establishing a call between said calling UE 13 and said called UE 14.

The method comprises a first step of receiving, by a node in the telecommunication network, a call establishment message for establishing said call between said calling UE and said called UE. Typically, the Session Border Gateway based network node, SBG, 103 is the node of the telecommunication network that receives the call establishment message first. As such, it may be beneficial if the presented method in accordance with the present disclosure takes place at that particular node. This ensures that all of the network nodes in the telecommunication network will be triggered by the parameter as will be discussed further on.

The SBG 103 may receive a call establishment message from the calling UE 13, said call establishment message containing an indication that the UE has indicated that it wishes to have recording for the call to be established. The SBG may receive a call establishment message from the calling UE 13, and the subscriber profile data that is stored in the SBG 103 comprises an indication that for calls from this subscriber, recoding shall take place.

Based on the above described context, the SBG 103 inserts, in the received call establishment message, a service logic execution recording parameter, wherein the parameter indicates that the network nodes involved in the establishing of the call between the calling UE 13 and the called UE 14 should perform service logic execution recording.

Besides inserting the parameter in the call establishment message, the SBG 103 may itself also start the recording of the service logic execution. That is, the SBG 103 does not only take actions to trigger any subsequent node in the chain of nodes to perform service logic execution recording, but it also performs the service logic execution recording itself.

As such, the SBG 103 transmits the call establishment message, i.e. the message having inserted therein the service logic execution recording parameter, to the next node in the chain of nodes, which is, in this particular situation, the S-CSCF as indicated with reference numeral 104. This parameter in the call establishment message triggers the subsequent node, i.e. the S-CSCF 104, to perform the service logic execution recording for that particular call to be established between the calling UE 13 and the called UE 14.

The above described process then continues for all the nodes in the chain of nodes, i.e. the nodes as indicated with reference numerals 105, 106, 107, 108, 109, 113, 114, 115, 116, 117 and 118. That is, each of the nodes in the chain of nodes will receive the call establishment message. These nodes will recognize the service logic execution recording parameter in the call establishment message, and will act accordingly. That is, each of these nodes will apply service logic execution recording for that particular call.

The parameter is also exchanged 112 with the corresponding Home Subscriber Server, HSS 111.

The service logic execution recording is any of recording of log files and recording of trace files reflecting signalling between said nodes in said chain.

Figure 3:
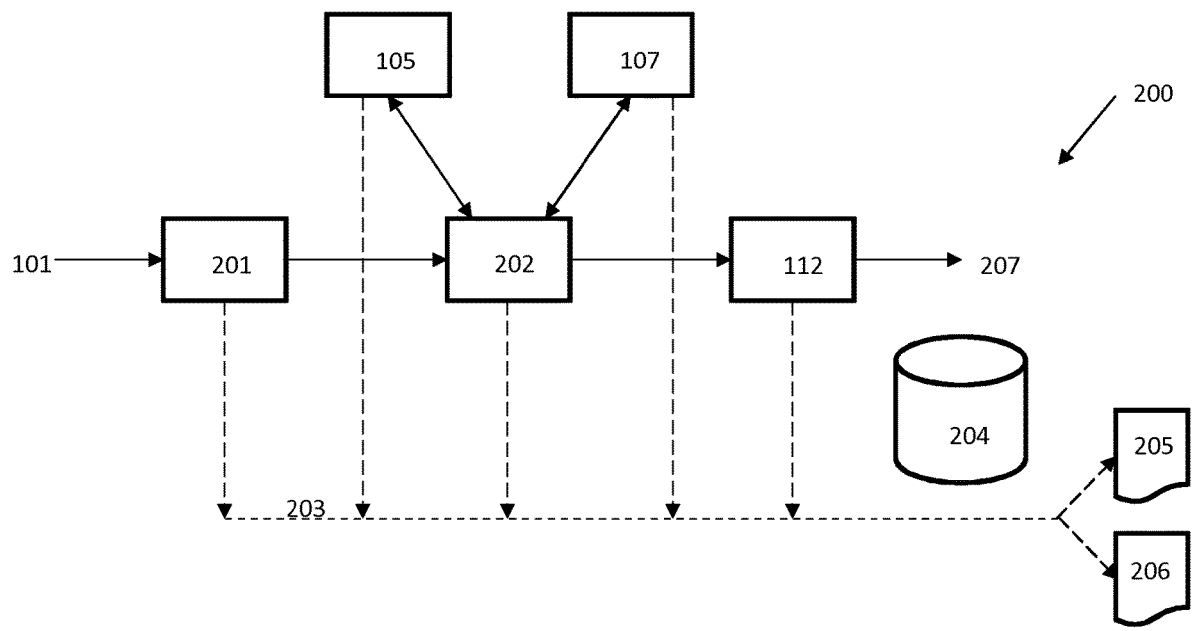
FIG. 3 is a schematic diagram illustrating an detailed example of the method of performing service logic execution recording.

FIG. 3 is a schematic diagram 200 illustrating a detailed example of the method of performing service logic execution recording.

The basic concept of the present disclosure is that a trigger instruction, i.e. a service logic execution parameter, is provided in a call establishment message, for example a SIP Invite message, which triggers each of the nodes in the chain of nodes to apply logging and/or tracing for the call corresponding to the call establishment message.

In an example, said parameter indicates that nodes involved in said establishing of said call between said calling UE and said called UE should perform service logic execution recording for a duration of that particular call only. That is, nodes should terminate the service logic execution recording whenever the session/call is terminated.

The advantage of the example provided above is that the amount of logging is controlled.

In a further example, the network node further inserts, in the call establishment message, a service logic execution recording store address, which address indicates to said nodes in said chain where said service logic execution recording is to be provided to, wherein said method further comprises the step of:

providing, by said node, said service logic execution recording to said address 204.

The address may, for example, be a File Transfer Protocol, FTP, address.

The above examples are depicted in FIG. 3.

Here, the trigger instruction may be accompanied by a file name and a destination, i.e. the store address, of the files to be generated, for example the log file 205 and a Transmission Control Protocol, TCP, dump file 206. This trigger instruction may, for example, be configured in an adapted UE, as a designated SIP header. Alternatively, it may be configured in the SBG 201 or the P-CSCF, automatically or by an operator command, for a particular subscriber.

The result of the above disclosed method is that log file and TCP dump file for exactly one particular call/session is generated, with the following further characteristics:

It does not matter in which node a particular function in the chain of nodes is being executed;

It does not matter on which blade/virtual machine within the node the function is executed;

The log files and trace files are generated and transferred to designated log file and trace file storage for all entities in the chain;

The method provides an end-to-end signalling view, as well as node-internal view for all involved functional entities.

Following the above, each of the nodes like the SBG 201, the S-CSCF 202, the SCC-AS 105, the MMTel-AS 107 and the I-CSCF 112 may be arranged to provide their service logic recording, using the address and the filename present in the call establishment message, to the storage 204.

In an example, the step of inserting comprises inserting said service logic execution recording parameter in a header of said call establishment message. The advantage hereof is that the network nodes in the chain of nodes are able to quickly identify whether they should perform service logic recording. As such, the triggering of these nodes is made effective.

In a further example, said parameter takes one value of a range of values, wherein each value indicates a recording granularity for said service logic execution recording.

The advantage hereof is that the network nodes know to what extent they should perform the service logic recording for that particular call which is to be established between the calling UE 101 and the called UE 207.

In another example, said network node further inserts in said call establishment message a service logic execution file name, which file name indicates to said nodes in said chain the file name to be used for storing said service logic execution, wherein said step of recording further comprises:

recording, by said node, said service logic execution using said file name.

The example hereof is that the file names which are used by each of the network nodes in the chain of nodes is uniformed, such that the file names can be traced back to each other via the storage 204.

In yet another example, the step of providing said service logic execution recording to said address is performed upon termination of said call between said calling UE and said called UE.

The advantage hereof is that the data generated by the service logic recording is transmitted to the storage 204 only once, for each call, thereby reducing any possible overhead messaging between the nodes and the storage 204.

In FIG. 3 it is specifically depicted that a calling UE establishes a SIP session. The SBG 201 inserts a designated command, i.e. a service logic recording parameter, in the corresponding SIP Invite request message, said command constituting an instruction to perform service logic execution recording, i.e. to apply logging and/or TCP dump for the SIP session. More specifically, the instruction imposes the S-CSCF 202, the SCC-AS 105, the MMTel-AS 107, the I-CSCF 112, and all other nodes in the chain of nodes, i.e. all the SIP entities that the Invite request message traverses, to perform the service logic execution recording, i.e. to apply logging and TCP dump for the duration of the SIP session.

The "logging and TCP dump file instruction" may be configured by the UE itself, which is hereto adapted. In an embodiment of the disclosure, the SBG 201 applies a subscription check; the "logging and TCP dump file instruction" is accepted in the Invite request message only when the calling UE has the required subscription option. i.e. only designated users will be able to use this functionality.

The service logic execution recording may comprise the following information:

Indication that logging shall be applied for the duration of the SIP session;

Indication of logging level, for example. "fine", "normal", "course", etc.;

a file name to be used for the recording, i.e. for the log file;

indication that a TCP dump shall be applied for the duration of the SIP session, wherein the TCP dump shall be applied on (virtual) Ethernet interfaces that are used by the corresponding application;

a file name to be used for the TCP dump file;

storage address to which the log file and/or the TCP dump file shall be provided.

At the end of the SIP session between the calling UE and the called UE, the log file and the TCP dump file, for each SIP entity, i.e. for each network node, are provided, for example FTP'd, to the storage 204 as indicated by the provided address, enabling the system tester/trouble shooter etc. to analyse the received information.

One of the advantages of the proposed automatic and controlled file naming for the log file and TCP dump file is that it eases the automatic collection, categorization, sorting, storing and aggregating of files belonging to one SIP session. That is, the actual file name may, for example, be derived from the identity of the calling UE, the identity of the called UE, a time stamp, or a combination of anything of these.

The logging and the TCP dump file generation may be automatically stopped at the end of the SIP session. This can be accomplished by recognizing, by each of the nodes in the chain of nodes, a termination message for terminating the SIP session.

One of the advantages of the present disclosure is that a person that is performing system testing, for system analysis, trouble shooting etc., will be able to obtain log files and TCP dump files for a particular call. Within each node of the telecommunication network, like the CSCF, SCC-AS, MMTel-AS etc., the SIP session may be served by any of the available and operational application instances on any of the blades/Virtual Machine's in the system. There is no need for activating, in all nodes and in all application instances, logging and TCP dump prior to the establishment of the call, and de-activating logging and TCP dump after completion of the call. Instead, logging and TCP dump are activated automatically for the particular call, and are automatically stopped when the corresponding call is terminated.

Generated log files and TCP dump files for this particular call are automatically provided, for example FTP'ed, to a designated collection device as indicated with the storage having reference numeral 204. When the corresponding call is complete, the log files of all the involved functional entities, like the SBG, CSCF etc., as well as the TCP dump files from these entities are available in the collection device, for processing by the person doing, for example, system tests.

The present disclosure is, according to a specific example, directed to a parameter which is introduced in a header of a SIP Invite message. The parameter is referenced to as a service logic execution parameter which indicates, by virtue of its presence, that nodes in a chain of nodes involved in the establishment of a call between a calling UE and a called UE should perform service logic execution recording for that particular call, i.e. for a particular session.

Typically, the parameter is introduced by the SBG but could also be introduced by any other node of the chain of nodes involved in the establishment of the call between the calling UE and the called UE.

In addition to the parameter, additional information may be inserted in the header of the SIP Invite message, such as
Logging
Log-level
Log-file-name
TCP-dump
TCP-file-name
FTP-address, etc.

In an example, the header of a SIP Invite message comprises:
P-Application-Logging: Logging=true; Log-level=5; Log-file-name="2016-12-31_23-00-00_log-file.txt"; TCP-dump=true; TCP-file-name="2016-12-31_23-00-00_dump-file.pcap"; FTP-address="ftp://log-server.my-network.com/log-files"

A node in the chain of nodes that receives an initial SIP Invite request message, or a SIP Message or a SIP Register, determines that this Invite request message comprises the specific parameter "P-Application-Logging" which corresponds to the service logic execution parameter. The application instance, i.e. the node in the chain, will, as a result, apply the required logging and TCP dump.

The added header of the SIP Invite message does not affect the SIP session establishment or the SIP handling as such. The header merely provides the instruction to apply logging and TCP dump. If a filename is included in the header, for the log file, that file name will be used by the nodes in the chain of nodes. Otherwise, the application and/or the node may apply a default method for constructing a log file name, including information such as date, time, host name, blade number etc. Likewise for TCP dump file name.

When the SIP session is terminated, the logic service execution recording, i.e. the logging and the TCP dump, is terminated and the generated log file and TCP dump file are provided, for example FTP'd, to the address indicated in the header. This address to which the files shall be FTP'd comprises a URL and a directory. The files can be placed directly in the directory where the system tester can retrieve them. The system tester should ensure that this directory exists on the indicated URL. In this particular scenario, the FTP-address is provided as "ftp://log-server.my-network.com/log-files".

Since the instruction to apply logging and to generate a TCP dump file is contained in the SIP session establishment, it does not matter on which blade or Virtual Machine the SIP session is handled. In, for example, cloud deployment, a network node like the SBG, CSCF or SCC-AS may be distributed over a number of Virtual Machines, blades or system racks. A SIP Invite message may be handled on one of a number of blades, Virtual Machines, system racks and/or network nodes. The logging and TCP dump will then be applied by the application regardless of the blade, Virtual Machine, system rack or node processing the Invite.

The information provided in the header may be removed from the SIP Invite message when the Invite message leaves the operator's domain. For example, when the SIP Invite message traverses the IBCF, towards another IMS operator, the information may be removed. The end-to-end logging and TCP dump is, in such a situation, restricted to the operator's own network.

Figure 4:
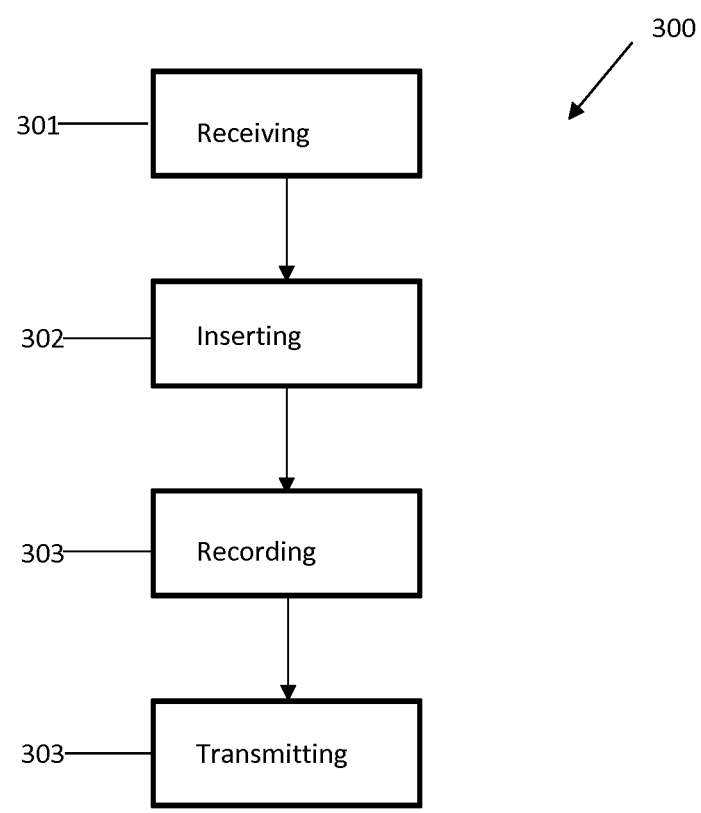
FIG. 4 is a typical flow chart illustrating an example of a method illustrating a typical example in accordance with the present disclosure.

FIG. 4 is a typical flow chart illustrating an example of a method in accordance with the present disclosure.

Figure 5:
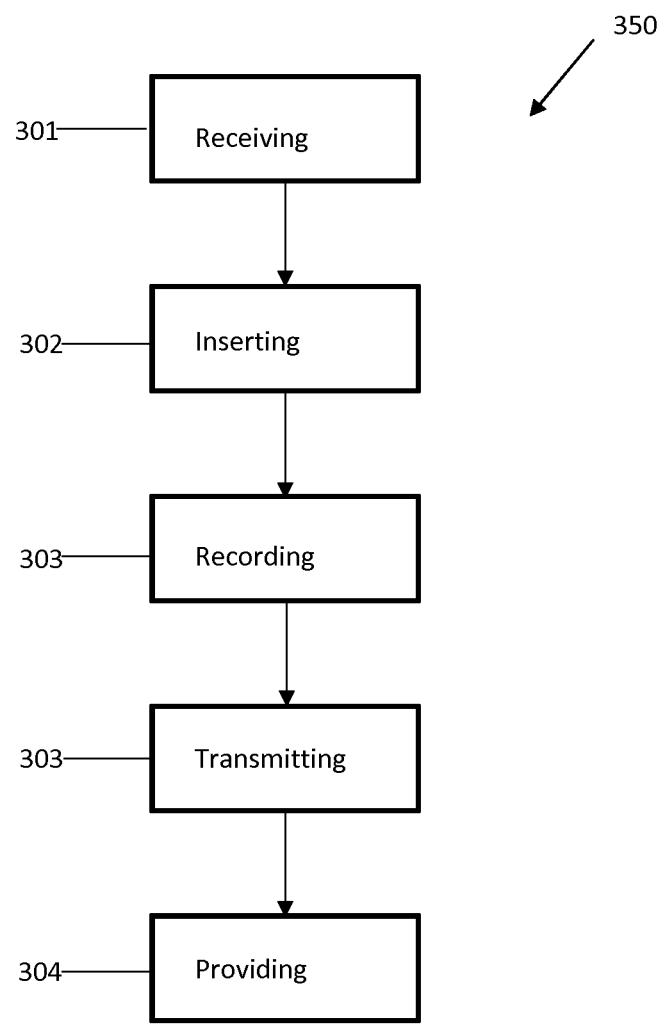
FIG. 5 is another typical flow chart illustrating an example of a method in accordance with the present disclosure.

FIG. 5 is another typical flow chart illustrating an example of a method in accordance with the present disclosure.

Both figures show an example of a method in accordance with the present disclosure, wherein FIG. 5 shows an additional step compared to the method shown in FIG. 4.

The methods shown 300, 350 are directed to triggering service logic execution recording of a call between a calling User Equipment, UE, and a called UE in a telecommunication network, wherein said service logic execution recording is to be triggered by nodes in a chain of nodes involved in establishing a call between said calling UE and said called UE In a first step 301, there is provided the step of receiving, by a node in the telecommunication network, a call establishment message for establishing said call between said calling UE and said called UE.

In a second step 302, there is provided the step of inserting, by said node, in said call establishment message, a service logic execution recording parameter, wherein said parameter indicates that nodes involved in said establishing of said call between said calling UE and said called UE should perform service logic execution recording.

In a third step 303, there is provided the step of recording, by said node, service logic execution for said call between said calling UE and said called UE.

In a fourth step 304, there is provided the step of transmitting, by said node, said call establishment message to a next node in said chain of nodes for establishing said call such that each of said nodes in said chain of nodes involved in said establishing of said call is triggered for performing said service logic execution recording for said call between said calling UE and said called UE.

In a fifth step 305, there is provided a step of providing, by said node, said service logic execution recording to a store address.

Here, said service logic execution recording is any of recording of log files and recording of trace files reflecting signalling between said nodes in said chain.

Figure 6:
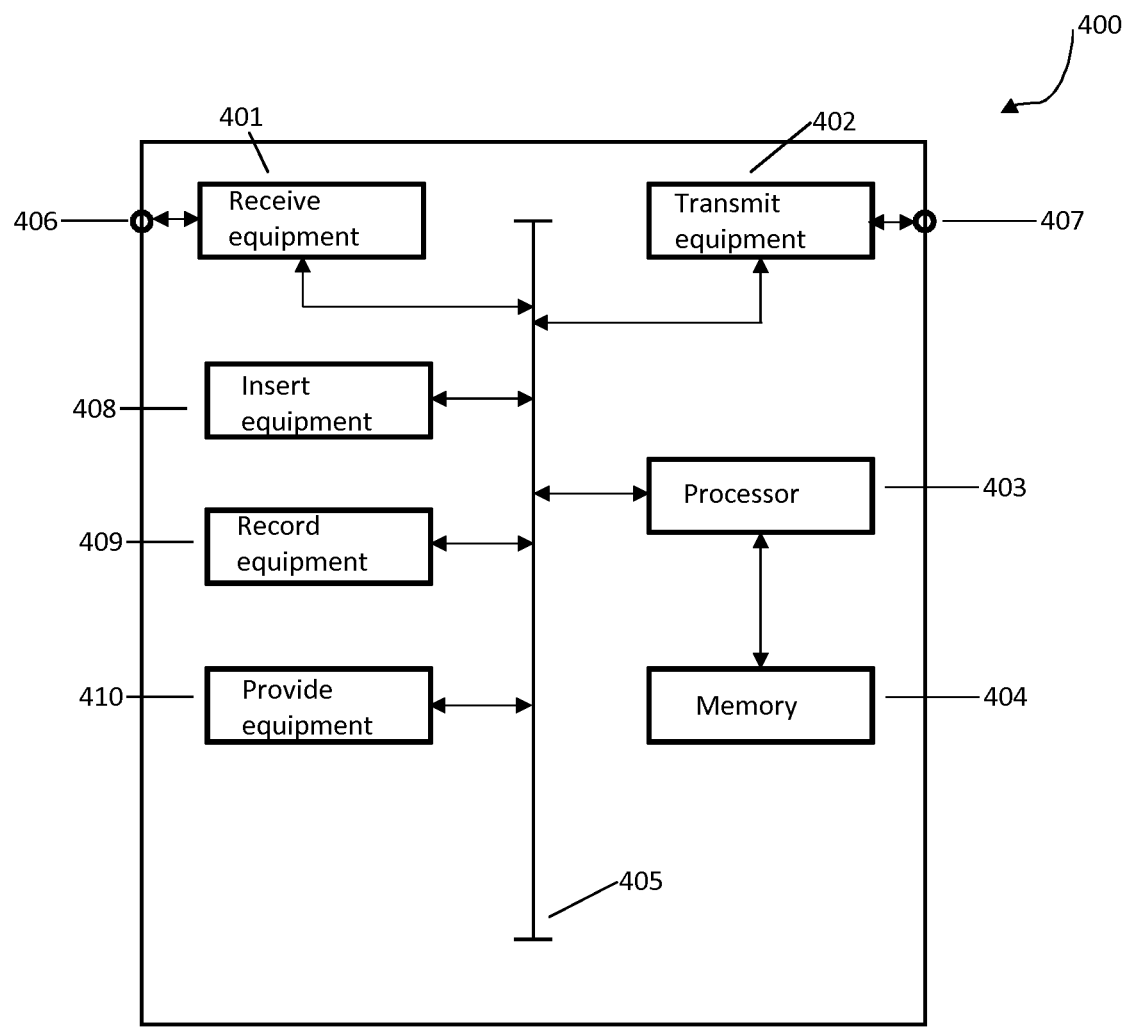
FIG. 6 is an example of a schematic diagram illustrating an example embodiment of a network node.

FIG. 6 is an example of a schematic diagram illustrating an embodiment of a network node according to the present disclosure.

The network node 400 is arranged for operation in a telecommunication network and is arranged for performing service logic execution recording for a call between a calling User Equipment, UE, and a called UE within said telecommunication network.

The network node 400 comprises receive equipment 401 arranged for receiving a call establishment message and establishing said call between said calling UE and said called UE.

The network node 400 further comprises insert equipment 408 arranged for inserting a service logic execution recording parameter into said call establishment message wherein said parameter indicates that nodes involved in said establishing of said call between said calling UE and said called UE should perform service logic execution recording.

The network node 400 further comprises record equipment 409 arranged for recording said service logic execution for said call between said calling UE and said called UE.

The network node 400 further comprises transmit equipment 402 arranged for transmitting said call establishment message to a next node in said chain of nodes for establishing said call such that each of said nodes in said chain of nodes involved in said establishing of said call is triggered for performing said service logic execution recording for said call between said calling UE and said called UE.

The network node 400 further comprises a processor 403 and a memory 404, which processor 403 is connected to the receive equipment 401, the transmit equipment 402 via a bus connection 405 or the like.

The network node 400 further comprises provide equipment 410 arranged for providing said service logic execution recording to a storage address.

Here, said service logic execution recording is any of recording of log files and recording of trace files reflecting signalling between said nodes in said chain of nodes.

Here, incoming data packets, or messages, pass through the input terminal 406 before they reach the receive equipment 401, or receiving module. Outgoing data packets or messages pass or are sent by the transmit equipment 402, or transmit module, via the output terminal 407.

In an example of the network node 400, the service logic execution recording parameter indicates that nodes involved in said establishing of said call between said calling UE and said called UE should perform service logic execution recording for a duration of that particular call only.

In a further example, said node is arranged to insert a service logic execution recording store address, which address indicates to said nodes in said chain where to provide said service logic execution recording, said node further comprising:

provide equipment arranged for providing said service logic execution recording to said address.

In yet another example, said address is a File Transfer Protocol, FTP, address.

In a further example of the network node, the trace files are recorded in Transmission Control Protocol, TCP, dump files.

In yet another example of the network node, the insert equipment is arranged to insert said service logic execution parameter in a header of said call establishment message.

In a further example of the network node, the parameter can take a range of values, wherein each value indicates a recording granularity for said service logic execution recording.

In another example of the network node, said insert equipment is further arranged for inserting a service execution file name in to said call establishment message, which file name indicates to said nodes in said chain of nodes, the file name to be used for storing said service logic execution, wherein said record equipment is further arranged for recording said service logic execution using said file name.

In yet another embodiment of the network node, the provide equipment provides said service logic execution recording to said address upon termination of said call between said calling UE and said called UE.

One of the advantages of the present disclosure is that an effective way of enabling service logic execution recording is accomplished without creating a substantial amount of overhead. The inventors have found that, for example, the header of a call establishment message may be used for indicating to each of the nodes in a chain of nodes involved in establishing a call between a calling UE and a called UE, that service logic execution recording should be applied. As such, a single node in the network, for example the SBG, may include a particular parameter in the header for indicating to each of these nodes that they should perform logic service execution.

The above does not need complex algorithms and/or processes to be run on the network nodes for determining when to perform service logic execution recording, as the information provided in the call establishment message forms the trigger itself for these nodes to start performing the recording.

The present disclosure is not limited to the embodiments as disclosed above, and can be modified and enhances by those skilled in the art beyond the scope of the present disclosure as disclosed in the appended claims without having to apply inventive skills.

The invention claimed is:

1. A method for triggering service logic execution recording for a call between a calling User Equipment (UE) and a called UE in a telecommunication network, wherein said service logic execution recording is to be applied by nodes in a chain of nodes involved in establishing a call between said calling UE and said called UE, wherein said method comprises the steps of:

receiving, by a node in the telecommunication network, a call establishment message for establishing said call between said calling UE and said called UE;

inserting, by said node, in said call establishment message, a service logic execution recording parameter, wherein said parameter indicates that nodes involved in said establishing of said call between said calling UE and said called UE should perform service logic execution recording;

transmitting, by said node, said call establishment message to a next node in said chain of nodes for establishing said call such that each of said nodes in said chain of nodes involved in said establishing of said call is triggered for performing said service logic execution recording for said call between said calling UE and said called UE;

wherein said service logic execution recording is any of recording of log files reflecting the application service logic processing in said nodes and recording of trace files reflecting signaling between said nodes in said chain.

2. The method of claim 1, wherein said parameter indicates that nodes involved in said establishing of said call between said calling UE and said called UE should perform service logic execution recording for a duration of that particular call only.

3. The method of claim 1, wherein said node further inserts a service logic execution recording store address, which address indicates to said nodes in said chain where said service logic execution recording is to be provided to, wherein said method further comprises the step of:
provide, by said node, said service logic execution recording to said address.

4. The method of claim 3, wherein said address is a File Transfer Protocol (FTP) address.

5. The method of claim 1, wherein said recording of trace files comprises recording said trace files in Transfer Control Protocol (TCP) dump files.

6. The method of claim 1, wherein said step of inserting comprises:
inserting said service logic execution recording parameter in a header of said call establishment message.

7. The method of claim 1, wherein said parameter takes a range of values, wherein each value indicates a recording granularity for said service logic execution recording.

8. The method of claim 1, wherein said node further inserts in said call establishment message a service logic execution file name, which file name indicates to said nodes in said chain the file name to be used for storing said service logic execution, wherein said step of recording further comprises:
recording, by said node, said service logic execution using said file name.

9. The method of claim 3, wherein said step of providing said service logic execution recording to said address is performed upon termination of said call between said calling UE and said called UE.

10. A network node in a telecommunication network arranged for performing service logic execution recording of a call between a calling User Equipment (UE) and a called UE within said telecommunication network, wherein said network node comprises:
receive equipment arranged for receiving a call establishment message and establishing said call between said calling UE and said called UE;
insert equipment arranged for inserting a service logic execution recording parameter into said call establishment message wherein said parameter indicates that nodes involved in said establishing of said call between said calling UE and said called UE should perform service logic execution recording;
transmit equipment arranged for transmitting said call establishment message to a next node in said chain of nodes for establishing said call such that each of said nodes in said chain of nodes involved in said establishing of said call is triggered for performing said service logic execution recording for said call between said calling UE and said called UE;
wherein said service logic execution recording is any of recording of log files and recording of trace files reflecting signaling between said nodes in said chain of nodes.

11. The network node of claim 10, wherein said service logic execution recording parameter indicates that nodes involved in said establishing of said call between said calling UE and said called UE should perform service logic execution recording for a duration of that particular call only.

12. The network node of claim 10 wherein said node further inserts a service logic execution recording store address, which address indicates to said nodes in said chain where to provide said service logic execution recording, said node further comprising:
provide equipment arranged for providing said service logic execution recording to said address.

13. The network node of claim 12, wherein said address is a File Transfer Protocol (FTP) address.

14. The network node of claim 10, wherein said trace files are recorded in Transmission Control Protocol (TCP) dump files.

15. The network node of claim 10, wherein said insert equipment inserts said service logic execution parameter in a header of said call establishment message.

16. The network node of claim 10, wherein said parameter can take a range of values, wherein each value indicates a recording granularity for said service logic execution recording.

17. The network node of claim 10, wherein said insert equipment is further arranged for inserting a service execution file name into said call establishment message, which file name indicates to said nodes in said chain of nodes, the file name to be used for storing said service logic execution, wherein said record equipment is further arranged for recording said service logic execution using said file name.

18. The network node of claim 12, wherein said provide equipment is arranged to provide said service logic execution recording to said address upon termination of said call between said calling UE and said called UE.

19. A non-transitory computer-readable medium comprising, stored thereupon, computer-program instructions for execution by a processor in a network node in a telecommunications network, the computer-program instructions comprising instructions configured to cause the network node to:
receive a call establishment message for establishing a call between a calling UE and a called UE;
insert in said call establishment message a service logic execution recording parameter, wherein said parameter indicates that nodes involved in said establishing of said call between said calling UE and said called UE should perform service logic execution recording;
transmit said call establishment message to a next node in a chain of nodes for establishing said call such that each of said nodes in said chain of nodes involved in said establishing of said call is triggered to perform said service logic execution recording for said call between said calling UE and said called UE;
wherein said service logic execution recording is any of recording of log files reflecting the application service logic processing in said nodes and recording of trace files reflecting signaling between said nodes in said chain.

* * * * *